(12) United States Patent
Yamauchi et al.

(10) Patent No.: US 7,799,133 B2
(45) Date of Patent: Sep. 21, 2010

(54) CRUCIBLE APPARATUS AND METHOD OF SOLIDIFYING A MOLTEN MATERIAL

(75) Inventors: Norichika Yamauchi, Ichihara (JP); Takehiko Shimada, Yokohama (JP)

(73) Assignee: IIS Materials Corporation, Ltd., Tokyo (JP)

( * ) Notice: Subject to any disclaimer, the term of this patent is extended or adjusted under 35 U.S.C. 154(b) by 370 days.

(21) Appl. No.: 11/414,544

(22) Filed: May 1, 2006

(65) Prior Publication Data

US 2007/0028835 A1  Feb. 8, 2007

(30) Foreign Application Priority Data

May 2, 2005  (JP) ............... 2005-161962

(51) Int. Cl.
 *C30B 21/02* (2006.01)
 *C30B 28/10* (2006.01)
 *C30B 30/04* (2006.01)
(52) U.S. Cl. ............... 117/210; 117/200; 117/218
(58) Field of Classification Search ......... 117/200–220, 117/900; 65/DIG. 8
 See application file for complete search history.

(56) References Cited

U.S. PATENT DOCUMENTS

| | | | | |
|---|---|---|---|---|
| 2,908,739 A * | 10/1959 | Rummel | ............ | 373/156 |
| 3,067,139 A * | 12/1962 | Goorissen | ............ | 117/31 |
| 3,185,565 A * | 5/1965 | Taylor | ............ | 75/414 |
| 3,278,282 A * | 10/1966 | Jaray | ............ | 65/492 |
| 3,918,946 A * | 11/1975 | Jaray | ............ | 65/495 |
| 4,049,384 A * | 9/1977 | Wenckus et al. | ............ | 117/203 |
| 4,154,291 A * | 5/1979 | Nielsen | ............ | 164/421 |
| 4,230,674 A * | 10/1980 | Taylor et al. | ............ | 117/210 |
| 4,308,908 A * | 1/1982 | Sevastakis | ............ | 164/464 |
| 4,315,538 A * | 2/1982 | Nielsen | ............ | 164/488 |
| 4,440,728 A * | 4/1984 | Stormont et al. | ............ | 117/210 |
| 4,544,528 A * | 10/1985 | Stormont et al. | ............ | 117/210 |
| 5,057,287 A * | 10/1991 | Swiggard | ............ | 117/219 |
| 5,474,022 A * | 12/1995 | Abe et al. | ............ | 117/214 |
| 5,897,706 A * | 4/1999 | Yamazaki et al. | ............ | 117/200 |
| 5,976,245 A * | 11/1999 | Aydelott | ............ | 117/19 |
| 6,072,118 A * | 6/2000 | Fukuda et al. | ............ | 136/258 |
| 6,180,872 B1 * | 1/2001 | Fukuda et al. | ............ | 136/258 |
| 6,277,351 B1 * | 8/2001 | Swinehart | ............ | 423/462 |
| 6,423,136 B1 * | 7/2002 | Swinehart | ............ | 117/82 |
| 6,562,133 B1 * | 5/2003 | Swinehart | ............ | 117/220 |
| 7,526,388 B2 * | 4/2009 | Yamauchi et al. | ............ | 702/40 |
| 2002/0007879 A1 * | 1/2002 | Nielsen, Jr. et al. | ............ | 148/433 |

(Continued)

FOREIGN PATENT DOCUMENTS

CA  956868  *  8/1978

(Continued)

*Primary Examiner*—G. Nagesh Rao
(74) *Attorney, Agent, or Firm*—Michael Tobias

(57) ABSTRACT

A crucible apparatus includes a hollow crucible body which is open at its upper and lower ends and a bottom plate which is formed separately from the crucible body and can close off the lower end of the crucible body. A space for receiving a molten material is formed by placing the crucible body atop the bottom plate. When molten material received in the space has solidified, the crucible body is raised off the bottom plate, and solidified material is pushed out of one end of the crucible body and removed from the crucible body.

20 Claims, 6 Drawing Sheets

U.S. PATENT DOCUMENTS

| | | | |
|---|---|---|---|
| 2003/0205358 A1* | 11/2003 | Kimura et al. | 164/493 |
| 2004/0118334 A1* | 6/2004 | Weber et al. | 117/19 |
| 2004/0192015 A1* | 9/2004 | Ammon et al. | 438/502 |
| 2007/0028835 A1* | 2/2007 | Yamauchi et al. | 117/206 |
| 2008/0311417 A1* | 12/2008 | Eichler et al. | 428/544 |

FOREIGN PATENT DOCUMENTS

| | | | |
|---|---|---|---|
| JP | 07248190 A | * | 9/1995 |
| JP | 2002226291 | | 8/2002 |

* cited by examiner

CRUCIBLE APPARATUS AND METHOD OF SOLIDIFYING A MOLTEN MATERIAL

BACKGROUND OF THE INVENTION

This invention relates to a crucible apparatus which can be used for solidifying a molten material and a method of solidifying a molten material using the apparatus. In particular, this invention relates to a crucible apparatus and solidifying method which are ideal for solidification of molten silicon obtained by melting scrap silicon and evaporating impurities in the silicon.

It is desirable to reuse scrap silicon which is formed when manufacturing semiconductor silicon. However, in some cases, scrap silicon contains impurities (dopants), so in order to reuse such scrap silicon, it is necessary to first remove the impurities and increase the purity of the silicon. Techniques for vacuum refining of scrap silicon using an electron beam have been developed in order to accomplish these tasks. In vacuum refining, lumps of silicon which are obtained by crushing of scrap silicon are irradiated with an electron beam and melted to evaporate impurities contained in the scrap silicon and increase the purity of the silicon. The molten silicon is then solidified in a crucible to obtain a high purity silicon ingot.

In the above-described method of vacuum refining of silicon, a one-piece quartz crucible like that described in Japanese Published Unexamined Patent Application 2002-226291 is typically used. However, in order to remove solidified silicon from such a crucible, it is necessary to destroy the crucible, so the crucible cannot be reused. A quartz crucible is extremely expensive, so the need to destroy the crucible increases the cost of refining scrap silicon.

SUMMARY OF THE INVENTION

The present invention provides a crucible apparatus which can be repeatedly used and a solidification method using the crucible apparatus.

A crucible apparatus according to one form of the present invention includes a hollow crucible body which is open at its upper end and lower end, and a separately formed bottom plate which can close off the lower end of the crucible body. A space for receiving a molten material is formed by placing the crucible body on the bottom plate.

The crucible body preferably has a circular transverse cross section to facilitate manufacture of the crucible body as well as removal of solidified material from the crucible body. The shape of the bottom plate is not restricted, but a circular shape may be advantageous from the standpoint of ease of manufacture. Various materials can be used for the crucible body and the bottom plate. For example, they can be made of a material such as copper having a lower melting point than silicon but having a sufficiently high thermal conductivity that the surface of the material in contact with molten silicon can be cooled so that the material does not contaminate the molten silicon by melting or leaching into it. Alternatively, it can be made of a material such a graphite having a higher melting point than silicon so that the material can be used in an uncooled state without melting or leaching into molten silicon. From a practical view point, the crucible body is preferably made of copper or graphite, and the bottom plate is preferably made of copper.

The crucible body may have a slit formed from its upper end to its lower end. Alternatively, the crucible body may be tapered such that the diameter of its upper end is slightly larger than the diameter of its lower end. When the crucible body has a slit or a taper, an excessive force is not applied to the crucible body if the molten material expands during the process of solidification, so cracks can be prevented from forming in the crucible body during solidification.

A solidification method according to one form of the present invention includes placing a crucible body which is open at its upper and lower ends atop a bottom plate to form a space for receiving a molten material, pouring a molten material into the space, solidifying the molten material inside the crucible body, removing the crucible body from the bottom plate, applying a force to one end of solidified material in the crucible body, and removing the solidified material from the crucible body through one end of the crucible body.

Prior to pouring the molten material into the receiving space defined by the crucible body and the bottom plate, a solid material is preferably placed into the bottom of the space so as to substantially cover the bottom of the receiving space. The solid material prevents molten material which is poured into the space from directly contacting the bottom surface of the space, whereby components of the crucible can be prevented from being mixed with the molten material due to thermal shock. The solid material preferably comprises the same substances as the molten material. For example, when the molten material comprises refined silicon, the solid material preferably comprises lumps of previously refined silicon.

According to another form of the present invention, a crucible apparatus includes a plurality of hollow crucible bodies, each of which is open at its upper and lower ends, and a rotatable table which can support the plurality of crucible bodies and close off the lower ends of the crucible bodies. A plurality of receiving spaces for receiving molten material are defined by placing the crucible bodies on the rotatable table. Due to the provision of a plurality of crucible bodies, it is possible to achieve a higher throughput by manufacturing a plurality of silicon ingots at the same time.

The crucible bodies preferably have a circular transverse cross section to facilitate their manufacture as well as removal of solidified material from the crucible bodies. The rotatable table is not restricted to any particular shape, but it will be typically be circular to facilitate manufacture. The crucible bodies are preferably made of copper or graphite, and the rotatable table is preferably made of copper.

Each crucible body may have a slit formed from its upper end to its lower end. Alternatively, each crucible body may be tapered such that the diameter of its upper end is slightly larger than the diameter of its lower end. As described above, when a crucible body has a slit or a taper, an excessive force is not applied to the crucible body if the molten material expands during the process of solidification, so cracks can be prevented from forming in the crucible body.

A solidifying method according to another form of the present invention includes placing a plurality of crucible bodies which are open at their upper and lower ends on a rotatable table to define a plurality of receiving spaces for receiving a molten material, rotating the rotatable table and successively positioning each of the receiving spaces in a position for receiving a molten material and pouring the molten material into each of the receiving spaces in succession, solidifying the molten material inside each of the receiving spaces, removing each of the plurality of crucible bodies from the rotatable table, applying a force to one end of solidified material in each crucible body with the crucible body in an inverted state, and removing the solidified material from each crucible body through one end of the crucible body.

Prior to pouring the molten material into the receiving spaces defined by the crucible bodies, a solid material is preferably introduced into the bottom of each receiving space so as to substantially cover the bottom of the receiving space. In the same manner as described above, the solid material prevents molten material which is poured into the space from directly contacting the bottom surface of the space, whereby components of the crucible can be prevented from being mixed with the molten material due to thermal shock. The solid material preferably comprises the same substance as the molten material.

With a crucible apparatus and solidification method according to the present invention, a crucible body can be repeatedly used, so not only can material costs of refining be decreased, but removal of solidified material is facilitated, so refining can be efficiently carried out.

DESCRIPTION OF PREFERRED EMBODIMENTS

Figure 1:
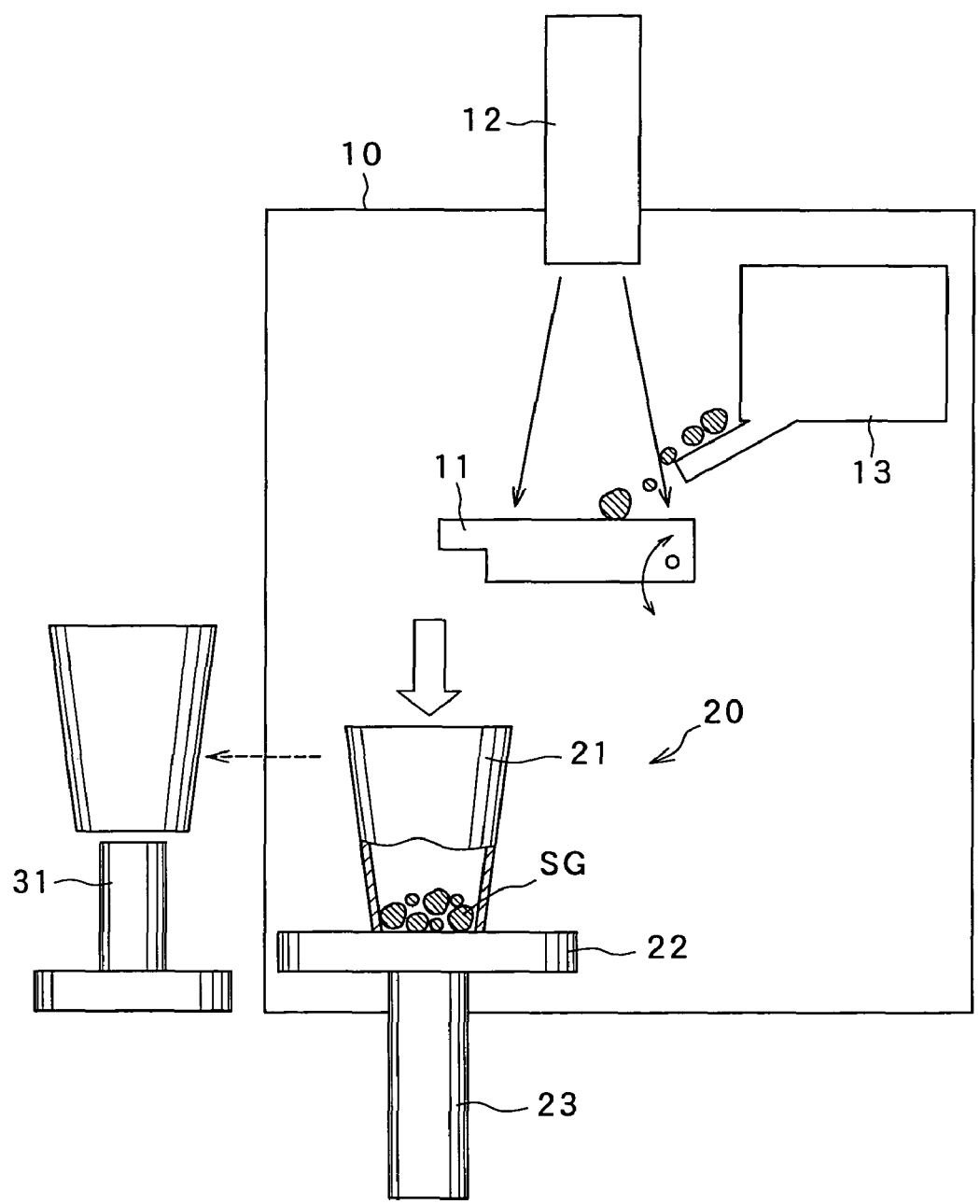
FIG. 1 is a schematic elevation of an electron beam refining apparatus equipped with a first embodiment of a crucible apparatus according to the present invention.

FIG. 1 schematically illustrates an electron beam refining apparatus equipped with a first embodiment of a crucible apparatus according to the present invention. As shown in FIG. 1, the electron beam refining apparatus includes a vacuum chamber 10 in which a tiltable hearth 11, a material supply unit 13, and a crucible apparatus 20 are provided. Lumps of silicon which were previously obtained by crushing scrap silicon are successively supplied from the supply unit 13 to the hearth 11, in which they are melted by an electron beam from an electron beam generating unit 12 disposed at the upper end of the vacuum chamber 10. The melting evaporates impurities contained in the scrap silicon to obtain molten silicon of high purity. The hearth 11 is then tilted, and molten silicon is poured from the hearth 11 into the crucible apparatus 20. The molten silicon is solidified inside the crucible apparatus 20 to form a high purity silicon ingot.

The crucible apparatus 20 comprises a hollow crucible body 21 which is open at its upper and lower ends, and a circular bottom plate 22 which closes off the lower end of the crucible body 21. The crucible body 21 has a circular transverse cross section. The bottom plate 22 is rigidly mounted atop a support shaft 23, while the crucible body 21 loosely rests atop the bottom plate 22. The crucible body 21 is made of copper, and it is tapered over its length so that the diameter of its upper end is slightly larger than the diameter of its lower end. Since copper has a melting point which is lower than that of silicon, both the crucible body 21 and the bottom plate 22 is preferably cooled during contact with molten silicon by cooling water supplied from an unillustrated cooling water supply and circulating through a cooling passage in thermal communication with the surfaces of the crucible body 21 and the bottom plate 22 contacted by molten silicon. For example, each of the crucible body 21 and the bottom plate 22 can have a double-walled structure with a passage for cooling water formed in its interior. Alternatively, pipes for cooling water can be mounted on an outer surface of the crucible body 21 and the bottom plate 22 and secured thereto by welding or other method which enables heat to be conducting between the pipes and the crucible body 21 and the bottom plate 22. In the illustrated embodiment, a helical cooling water passage is formed on the interior of the crucible body 21, and a spiral cooling water passage is formed on the interior of the bottom plate 22. Since the crucible body 21 simply rests atop the bottom plate 22, minute gaps may be present between the crucible body 21 and the bottom plate 22, but due to the viscosity and surface tension of the molten silicon, molten silicon does not flow to the outside through the minute gaps.

The tapered shape of the crucible body 21 enables molten material to expand inside the crucible body 21 without producing excessive stresses in the crucible body 21. The larger the angle of taper, the lower are the stresses applied to the wall of the crucible body 21, but as the angle of taper increases, the diameter of the upper end of the crucible body 21 increases, and more room is required for storing the crucible body 21 or accommodating the crucible body 21 in the vacuum chamber 10. In addition, when the angle of taper of the crucible body 21 is large, the resulting silicon ingot takes on an inconvenient shape. Therefore, from a practical standpoint, the angle of taper (the angle of the inner surface of the crucible body 21 with respect to the axis of the crucible body 21) is preferably in the range of 5 to 20 degrees. When the diameter of the crucible body 21 is less than 200 mm, the taper angle is preferably in the range of 10 to 20 degrees, and when the diameter of the crucible body 21 is at least 200 mm, the taper angle is preferably in the range of 5 to 20 degrees. A specific example of dimensions of the crucible body 21 is a height of 700 mm, a lower end diameter of 250 mm, and an upper end diameter of 335 mm, which gives a taper angle of approximately 6 degrees.

Figure 2:
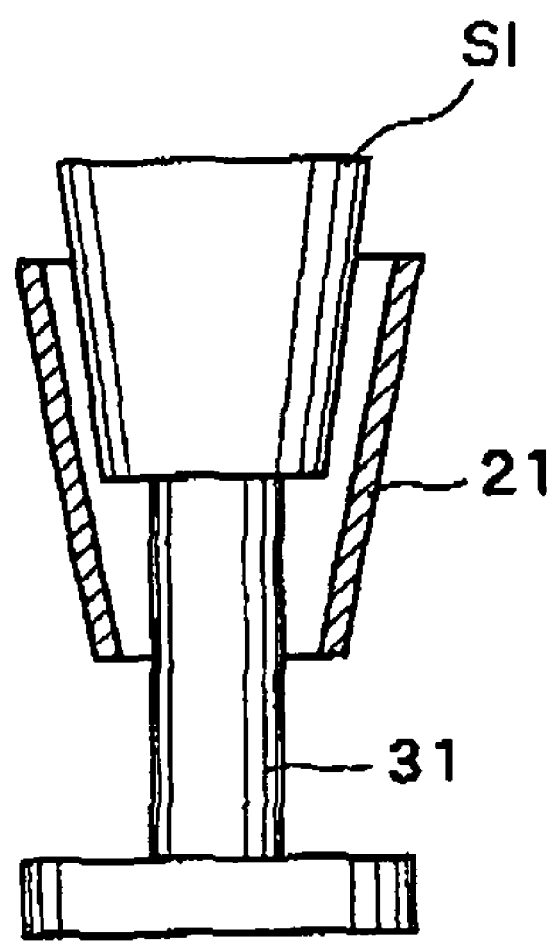
FIG. 2 is a cutaway elevation showing the state in which a silicon ingot is engaged with the ejector rod of FIG. 1 to remove the ingot from a crucible body.

An ejector rod 31 is provided on the outside of the vacuum chamber 10. The ejector rod 31 projects upwards from the center of a support base. The crucible body 21 is transported from inside the vacuum chamber 10 to above the ejector rod 31 by an unillustrated conveyor, and the bottom surface of a silicon ingot SI formed by solidification of molten silicon inside the crucible body 21 is contacted with the ejector rod 31. As shown in FIG. 2, the silicon ingot SI is then pushed out of the crucible body 21 while contacting the ejector rod 31 by moving the ejector rod 31 upwards and/or by moving the crucible body 21 downwards to produce relative movement of the ejector rod 31 and the crucible body 21. The silicon ingot SI which was pushed out of the crucible body 21 is carried to a prescribed location either by hand or by a separate conveyor.

The material supply unit 13 can be any device capable of supplying material for refining to the hearth 11 in controlled amounts while operating inside a vacuum. One example of a suitable material supply unit 13 is a commercially available vibratory parts feeder (e.g., a JA-type bulk hopper of SANKI Co., Ltd.) modified for use in a high-temperature vacuum by, for example, replacement of parts made of iron with parts made of stainless steel in order to prevent formation of rust in the high-temperature vacuum, and replacement of ordinary grease with grease for use in a vacuum. Examples of other types of mechanisms which can be used for the material supply unit 13 instead of a vibratory parts feeder are a combination of a hopper and a screw feeder, a combination of a hopper and a gate mechanism, a combination of a container and a manipulator, and a combination of a container and a conveyer.

The operation of the refining apparatus of FIG. 1 and a solidification method using the crucible apparatus 20 will next be described. Prior to the start of refining, the crucible body 21 is placed on the bottom plate 22 to define a receiving space for receiving molten silicon. The material supply unit 13 is then filled with lumps of silicon to be refined. A vacuum is then established in the vacuum chamber 10, and lumps of silicon are supplied from the material supply unit 13 to the hearth 11, in which they are melted by an electron beam from the electron beam generating unit 12. The refined molten silicon which results is poured from the hearth 11 into the crucible apparatus 20, in which it is solidified to form a silicon ingot SI. After the completion of solidification, the interior of the vacuum chamber 10 is restored to atmospheric pressure, an unillustrated ingot discharge opening of the vacuum chamber 10 is opened, and the crucible body 21 containing the silicon ingot SI is removed from the bottom plate 22 and moved to the outside of the vacuum chamber 10 through the ingot removal port by an unillustrated conveyor. The crucible body 21 is carried to a position above the ejector rod 31. Silicon does not adhere to the water-cooled copper forming the bottom plate 22, and the crucible body 21 merely rests atop the bottom plate 22, so the crucible body 21 can be easily removed from the bottom plate 22 when it is carried to the outside of vacuum chamber 10. When the crucible body 21 is positioned above the ejector rod 31, the bottom surface of the silicon ingot SI inside the crucible body 21 is contacted by the ejector rod 31, and as shown in FIG. 2, the silicon ingot SI is pushed upwards and out of the crucible body 21. The wettability by silicon of the copper forming the crucible body 21 is low, so the silicon ingot SI can be easily pushed out of the crucible body 21.

Prior to pouring molten silicon into the receiving space, a solid material in the form of lumps of refined silicon SG is preferably placed into the bottom portion of the receiving space so as to nearly cover the bottom surface of the receiving space. When molten silicon is subsequently poured into the receiving space, it can be prevented by the lumps of silicon SG from directly contacting the bottom surface of the receiving space, so components of the crucible body 21 or the bottom plate 22 can be prevented from mixing into the molten silicon due to thermal shock. The size of the lumps of refined silicon SG is preferably such that the lumps will readily melt into the molten silicon being poured into the crucible body 21 from the hearth 11.

In this embodiment, the crucible body 21 is positioned above the ejector rod 31 with the larger diameter end of the crucible body 21 facing upwards, but alternatively, the crucible body 21 can be positioned below the ejector rod 31 in an inverted state with its larger diameter end facing downwards, and the ejector rod 31 can be contacted with the silicon ingot SI from above to remove the silicon ingot SI from the crucible body 21.

Figure 3:
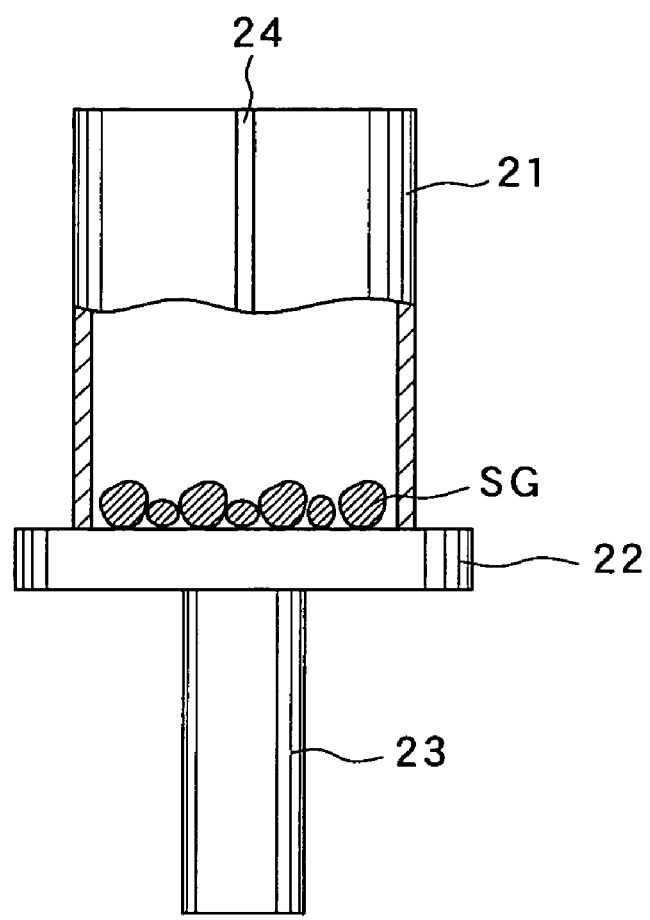
FIG. 3 is an elevation of a second embodiment of a crucible apparatus according to the present invention.
Figure 4:
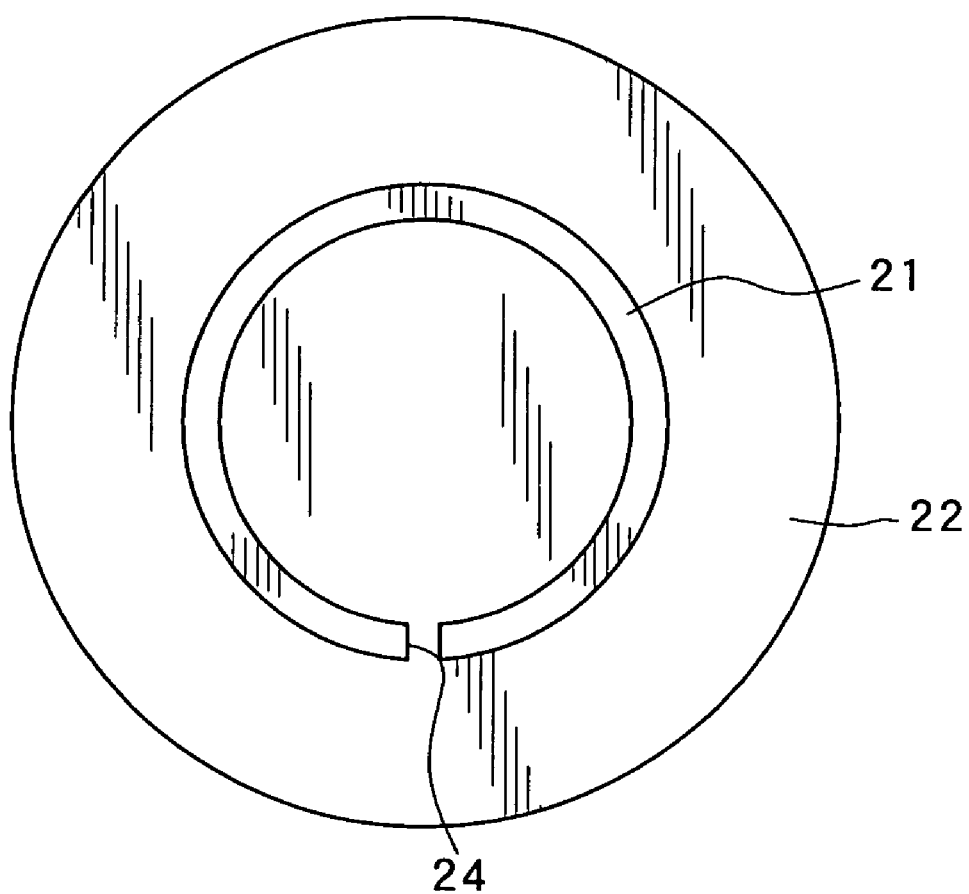
FIG. 4 is a top view of the crucible apparatus of FIG. 3.

FIGS. 3 and 4 illustrate a second embodiment of a crucible apparatus 20 according to the present invention. In this embodiment, the crucible apparatus 20 comprises a cylindrical crucible body 21 made of graphite which is open at its upper and lower ends and a circular bottom plate 22 which closes off the lower end of the crucible body 21. The crucible body 21 can be disposed atop the bottom plate 22 in the same manner as in the previous embodiment. A slit 24 is formed completely through the wall thickness of the crucible body 21 over its entire length from its upper end to its lower end. The slit 24 enables the crucible body 21 to be deformed in the radial direction and the circumferential direction. The bottom plate 22 is made of copper, and as in the previous embodiment, a helical passage through which cooling water which is supplied from an unillustrated cooling water supply can circulate is formed in its interior. Due to the high melting point of graphite it is not necessary to provide a cooling water passing for the crucible body 21. The width of the slit 24 is typically 3-10 mm when the crucible body 21 is used for solidification of molten silicon. Due to its viscosity and surface tension, molten silicon which is poured into the crucible body 21 does not flow to the outside of the crucible body 21 through the slit 24. During the use of the embodiment of the crucible apparatus 20, if molten silicon which is poured into the crucible apparatus 20 expands during the process of solidification, the crucible body 21 can expand with the solidifying silicon due to the provision of the slit 24, so an excessive force is not applied to the crucible body 21, and there is no fear of damage to the crucible body 21. In this example, the width of the slit 24 is 3-10 mm, but if this embodiment of a crucible apparatus is used for the solidification of a material other than silicon, the width of the slit 24 can be set to a different range in accordance with the viscosity and surface tension of the material so that the molten material will not leak out of the crucible body 21 through the slit 24. This embodiment can be used with an electron beam refining apparatus to solidify molten silicon and form a silicon ingot in substantially the same manner as with the embodiment of FIG. 1. In the present embodiment, the slit 24 extends in a straight line in the vertical direction. However, the slit 24 need not be straight or completely vertical. For example, it may be helical or S-shaped.

Figure 5:
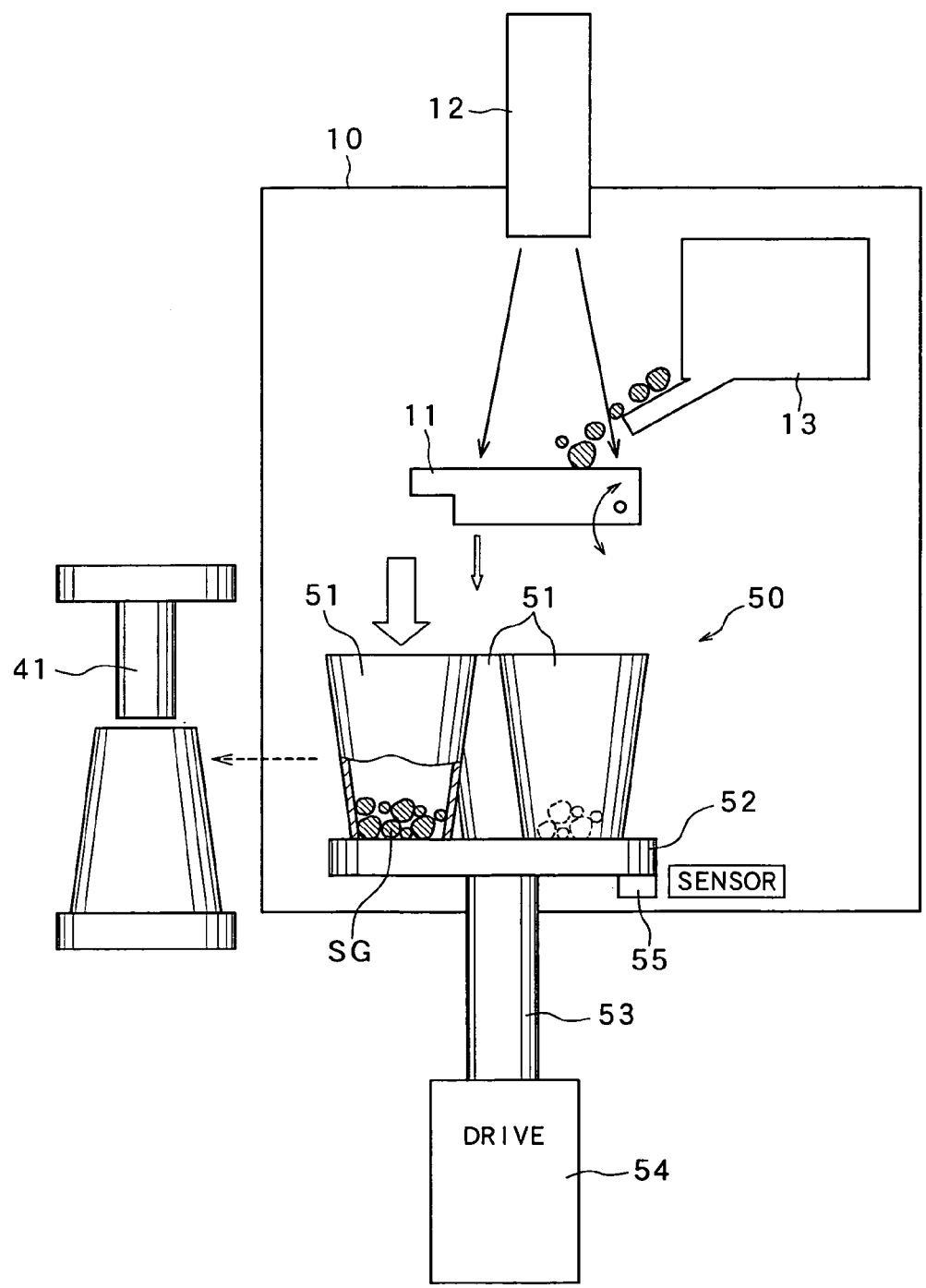
FIG. 5 is a schematic elevation of an electron beam refining apparatus employing a third embodiment of a crucible apparatus according to the present invention.
Figure 6:
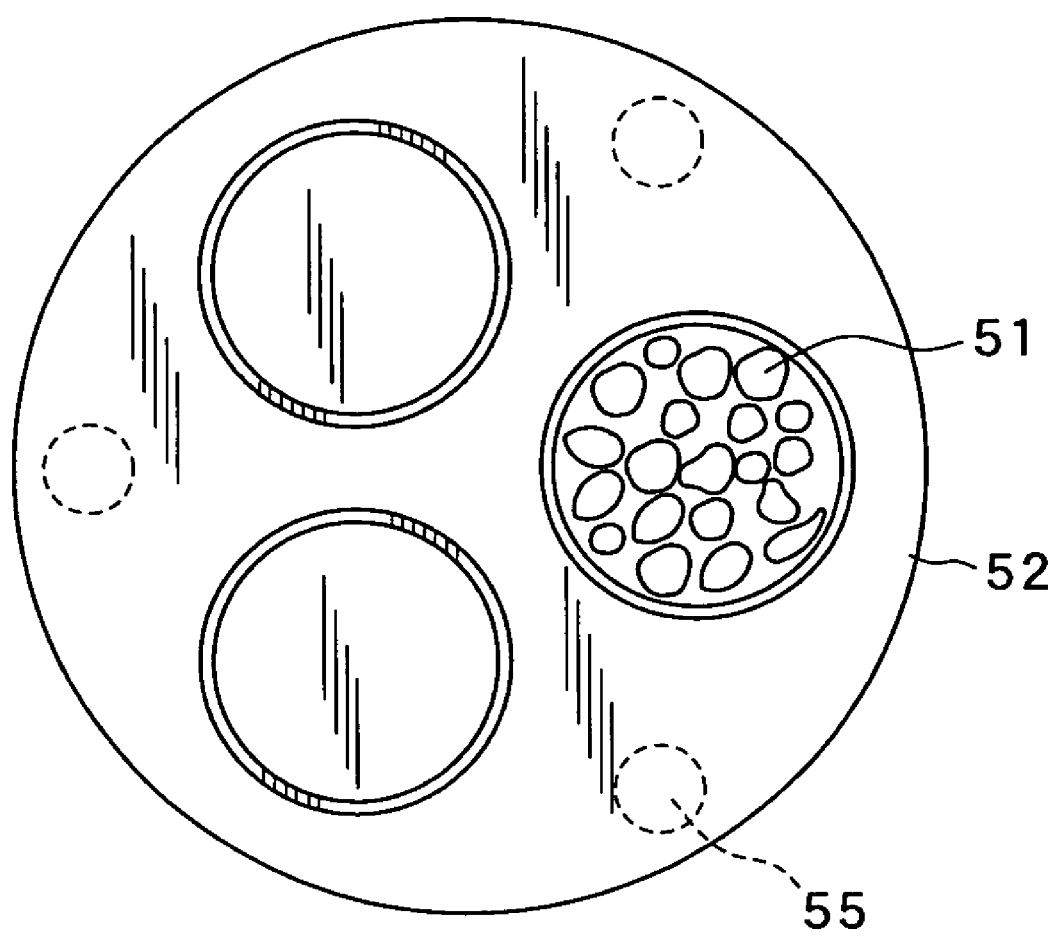
FIG. 6 is a plan view of the crucible apparatus of FIG. 5.

A third embodiment of a crucible apparatus according to the present invention will next be described while referring to FIGS. 5 and 6. FIG. 5 is a schematic elevation of an electron beam refining apparatus employing this embodiment of a crucible apparatus, and FIG. 6 is a plan view of the crucible apparatus of FIG. 5. The overall structure of the refining apparatus shown in FIG. 5 is similar to that of the refining apparatus of FIG. 1, so the same components as in FIG. 1 are indicated by the same symbols, and the following explanation will concentrate on components which are different in structure from in FIG. 1.

As shown in FIG. 5, a vacuum chamber 10 houses a tiltable hearth 11, a material supply unit 13, and a crucible apparatus 50. An electron beam generating unit 12 is provided in the upper portion of the vacuum chamber 10 for irradiating lumps of silicon in the hearth 11 with an electron beam.

This embodiment of a crucible apparatus 50 includes a plurality of hollow crucible bodies 51 which are open at their upper and lower ends, a circular rotatable table 52 which supports the plurality of crucible bodies 51 and closes off their lower ends, a support shaft 53 which supports the rotatable table 52, and a positioning mechanism which can rotate the rotatable table 52 so as to position the crucible bodies 51 in prescribed rotational positions. The positioning mechanism includes a drive mechanism 54 for rotating the rotatable table 52 and an unillustrated sensor for sensing the rotational position of the rotatable table 52. The drive mechanism 54 may be located either inside or outside of the vacuum chamber 10 and may rotate just the rotatable table 52, or the support shaft 53 may be secured to the rotatable table 52 and the drive mechanism 54 may rotate the rotatable table 52 by rotating the support shaft 53. It is generally easier from a manufacturing standpoint to provide the drive mechanism 54 on the exterior of the vacuum chamber so that it need not have the ability to operate in a vacuum. The drive mechanism 54 may comprise any type of conventional mechanism for producing controlled rotational movement, such as an element motor, which may be equipped with a reduction gear. The sensor may be any device capable of determining the rotational position of the rotatable table, such as a conventional encoder which senses rotation of the motor of the drive mechanism 54, the support shaft 53, or the rotatable table 52 itself. In the illustrated embodiment, a plurality of magnets 55 are secured to the bottom surface of the rotatable table 52 at prescribed intervals (such as every 120 degrees), and a magnetic sensor is disposed in the vicinity of the rotatable table 52 where it can sense the magnets 55. An output signal from the sensor can be provided to an unillustrated controller, which controls the drive mechanism 54 in accordance with the signal from the sensor.

As shown in FIG. 6, in this embodiment, the crucible apparatus 50 includes three crucible bodies 51 positioned on the rotatable table 52 at equal intervals in the circumferential direction. Although not shown in the drawings, three cylindrical recesses for positioning the crucible bodies 51 are provided in the top surface of the rotatable table 52 at equal intervals in the circumferential direction. The diameter of the cylindrical recesses is slightly larger than the diameter of the lower end of the crucible body 51. Each crucible body 51 is made of copper and is tapered like the crucible body 21 of FIG. 1 so that the diameter of its upper end is slightly larger than the diameter of the lower end. Alternatively, instead of being tapered, each crucible body 51 may have a lengthwise slit like the crucible body 21 shown in FIG. 3. A helical passage through which cooling water which is supplied from unillustrated cooling water source can pass is formed in the interior of each crucible body 51. The rotatable table 52 is also made of copper, and in locations corresponding to each of the cylindrical recesses, a spiral passage is formed through which cooling water which is supplied from an unillustrated cooling water supply can pass.

In this embodiment, the positioning mechanism rotates the rotatable table 52 by 120 degrees at a time, whereby the plurality of crucible bodies 51 can successively positioned beneath a silicon pouring position in which molten silicon can be poured from the hearth 11 into one of the crucible bodies 51.

An ejector rod 41 is disposed on the outside of the vacuum chamber 10. A crucible body 51 positioned in a removal position on the rotatable table 52 can be transported by an unillustrated conveyor to atop a support base below the ejector rod 41. The crucible body 51 is placed atop the support base in an inverted attitude in which the end of the crucible body 51 which faced downwards when the crucible body 51 was atop the rotatable table 52 (the smaller diameter end) now faces upwards. In this state, the ejector rod 41 is lowered to contact the upper surface of the silicon ingot inside the crucible body 51. By pressing the ejector rod 41 against the silicon ingot, the silicon ingot is moved downwards inside the crucible body 51 and is separated from the crucible body 51. The crucible body 51 is then removed and the silicon ingot remains atop the support base, from where it can be moved to a prescribed position by hand or by a separate conveyor.

Next, the operation of the refining apparatus of FIG. 5 and particularly a solidifying method using the crucible apparatus 50 will be described. Prior to the start of refining, three crucible bodies 51 are placed atop the rotatable table 52 to define three receiving spaces for receiving molten silicon, with one of the crucible bodies 51 positioned in a silicon pouring position beneath the hearth 11. The material supply unit 13 is filled with lumps of silicon to be refined. As in the previous embodiments, a solid material in the form of lumps of refined silicon SG is preferably placed into the bottom portion of each receiving space so as to nearly cover the bottom surface of the receiving space. The inside of the vacuum chamber 10 is then evacuated to form a vacuum, lumps of silicon are supplied from the material supply unit 13 to the hearth 11, and the lumps of silicon in the hearth 11 are irradiated with an electron beam from the electron beam generating unit 12 to melt them and evaporate impurities from the molten silicon. The resulting refined molten silicon is then poured from the hearth 11 into the crucible body 51 positioned in the silicon pouring position. When the crucible body 51 positioned in the silicon pouring position is filled to a prescribed level with molten silicon, the positioning mechanism 54 is operated, and the rotatable table 52 is rotated to move the next crucible body 51 to the silicon pouring position. When the next crucible body 51 is properly positioned, lumps of silicon are again supplied from the material supply unit 13 to the hearth 11, the lumps of silicon are melted by an electron beam to refine the silicon, and the resulting refined molten silicon is poured from the hearth 11 into the crucible body 51 positioned in the silicon pouring position. When the crucible body 51 positioned in the silicon pouring position is filled to a prescribed level with molten silicon, the positioning mechanism 54 is again operated, and the rotatable table 52 is rotated to move the next crucible body 51 to the silicon pouring position. The above-described procedure is then repeated, and refined molten silicon is poured into the crucible body 51 positioned in the silicon pouring position. In the above-described procedure, lumps of silicon to be refined are supplied to the hearth 11 from the material supply unit 13 after each time that molten silicon is poured into one of the crucible bodies 51, but the lumps of silicon may also be supplied to the hearth 11 at less frequent intervals.

After solidification of the molten silicon inside each of the crucible bodies 51 is completed, the interior of the vacuum chamber 10 is restored to atmospheric pressure, and an unillustrated ingot removal port in the vacuum chamber 10 is opened. The three crucible bodies 51 inside the vacuum chamber 10 are successively moved to an ingot removal position, and they are carried to the outside of the vacuum chamber 10 through the ingot removal port by an unillustrated conveyor. Each crucible body is placed atop the support base in an inverted state, i.e., with the smaller diameter end of the crucible body 51 facing upwards. When one of the crucible bodies 51 is disposed atop the support base below the ejector rod 41, the ejector rod 41 is lowered and brought into contact with the upper surface of the silicon ingot SI inside the crucible body 51 to separate the silicon ingot SI from the crucible body 51. The crucible body 51 is then removed, and the silicon ingot remaining on the support base is carried to a prescribed position by hand or by a separate conveyor.

In the above-described embodiments, a crucible apparatus according to the present invention is used for solidification of refined molten silicon obtained by vacuum refining with an electron beam, but the present invention can also be used for solidification of other molten materials obtained by other procedures.

What is claimed is:

1. A crucible apparatus for solidifying a molten material comprising:
    a hollow crucible body which is made of copper or graphite and which is open at its upper and lower ends and which has an exterior wall extending between the upper end and the lower end of the crucible body without any openings communicating between the interior and the exterior of the crucible body, and a separate bottom plate which is made of copper and which can close off the lower end of the crucible body, a space for receiving a molten material being formed by placing the crucible body atop the bottom plate.

2. A crucible apparatus as claimed in claim 1 wherein the crucible body has a circular transverse cross section.

3. A crucible apparatus as claimed in claim 2 wherein the crucible body is tapered such that the diameter of its upper end is larger than the diameter of its lower end.

4. A solidifying method for solidifying a molten material using the crucible apparatus of claim 1 comprising:
   placing the crucible body of the crucible apparatus of claim 1 atop the bottom plate to form the space for receiving a molten material;
   pouring a molten material into the space;
   solidifying the molten material inside the crucible body;
   removing the crucible body from the bottom plate;
   applying a force to one end of solidified material in the crucible body; and
   removing the solidified material from the crucible body.

5. A method as claimed in claim 4 including placing a solid material into a bottom portion of the space so as to substantially cover the bottom surface of the space prior to pouring the molten material into the space.

6. A method as claimed in claim 5 wherein the solid material comprises the same material as the molten material.

7. A method as claimed in claim 6 wherein the solid material comprises lumps of refined silicon and the molten material comprises molten silicon.

8. A crucible apparatus for solidifying a molten material comprising:
   a plurality of hollow crucible bodies, each of which is open at its upper and lower ends and has an exterior wall extending between its upper and lower ends without any openings communicating between the interior and the exterior of the crucible body, and a rotatable table which can support the plurality of crucible bodies and close off the lower end of each crucible body, a plurality of spaces for receiving a molten material being formed by placing the crucible bodies atop the rotatable table.

9. A crucible apparatus as claimed in claim 8 wherein each of the crucible bodies has a circular transverse cross section.

10. A crucible apparatus as claimed in claim 9 wherein each crucible body is tapered such that the diameter of its upper end is larger than the diameter of its lower end.

11. A crucible apparatus for solidifying a molten material comprising:
   a plurality of hollow crucible bodies, each of which is open at its upper and lower ends and has a slit extending from its upper end to its lower end, and a rotatable table which can support the plurality of crucible bodies and close off the lower end of each crucible body, a plurality of spaces for receiving a molten material being formed by placing the crucible bodies atop the rotatable table.

12. A crucible apparatus as claimed in claim 8 wherein the rotatable table is made of copper and the crucible bodies are made of copper or graphite.

13. A solidifying method for solidifying a molten material using the crucible apparatus of claim 8 comprising:
   placing each of the hollow crucible bodies of the crucible apparatus of claim 8 atop the rotatable table to close off the lower end of each crucible body and form the plurality of spaces for receiving a molten material;
   rotating the rotatable table to successively position each of the spaces in a material receiving position and successively pouring a molten material into each of the spaces;
   solidifying the molten material poured into the plurality of spaces;
   removing the plurality of crucible bodies from the rotatable table;
   applying a force to one end of the solidified material in each crucible body; and
   removing the solidified material from each crucible body.

14. A method as claimed in claim 13 including introducing a solid material into the bottom portion of each the plurality of spaces so as to substantially cover the bottom surface of the rotatable table inside the spaces prior to pouring the molten material into the plurality of spaces.

15. A method as claimed in claim 13 wherein the solid material comprises the same material as the molten material.

16. A method as claimed in claim 14 wherein the solid material comprises lumps of refined silicon and the molten material comprises molten silicon.

17. A crucible apparatus as claimed in claim 3 wherein the crucible body is tapered by 5-20 degrees.

18. A crucible apparatus as claimed in claim 10 wherein the crucible body is tapered by 5-20 degrees.

19. A crucible apparatus as claimed in claim 1 wherein the bottom plate has a top surface with an outer periphery which can completely surround an outer periphery of the lower end of the crucible body when the lower end of the crucible body is placed on the top surface.

20. A crucible apparatus as claimed in claim 1 wherein the bottom plate has a region of uniform height on its top surface which is large enough to surround an entire periphery of the lower end of the crucible body when the lower end of the crucible body is placed on the region.

* * * * *